J. A. SWINEHART.
METHOD OF MAKING RUBBER TIRES.
APPLICATION FILED JULY 12, 1918.

1,326,991.

Patented Jan. 6, 1920.

Witness
Geo. E. Kricker.

Inventor
J. A. SWINEHART.

By Fisher & ____
Attorneys

UNITED STATES PATENT OFFICE.

JAMES A. SWINEHART, OF AKRON, OHIO.

METHOD OF MAKING RUBBER TIRES.

1,326,991.        Specification of Letters Patent.        Patented Jan. 6, 1920.

Application filed July 12, 1918. Serial No. 244,545.

*To all whom it may concern:*

Be it known that I, JAMES A. SWINEHART, a citizen of the United States, residing at Akron, in the county of Summit and State of Ohio, have invented certain new and useful Improvements in Methods of Making Rubber Tires, of which the following is a specification.

My invention pertains to an improved method and means for making rubber tires, the primary object being to prevent the formation of folds, buckles, or seams in the fabric or cord carcass of a tire during the steps taken in treating the carcass or vulcanizing the rubber tread upon such carcass within a metal mold. The general practice in molding a tire, is to build up the tire on a core and place the tire and core between two annular mold sections and then apply pressure to the sections to bring them together uniformly at all points in their meeting faces. This action compresses the rubber within the mold and crowds it toward the tread parting line between the mold sections, thereby frequently producing folds and buckles in the tread portion of the carcass to the great detriment to the tire.

My conception is to use two annular mold sections and a core constructed substantially as shown and described in my application for a patent bearing Serial Number 215,032, filed Feb. 2, 1918, and therewith impart a graduated pressure to a tire or tire casing made of rubber and fabric or cords, the application of pressure to the mold being axially of the mold and core and the application of pressure to the tire beginning at the tread portion of the tire and moving toward and to the base or bead portions of the tire, in this way pressing the mold sections together at their center and compressing and forcing the rubber and the fabric jointly on opposite sides of the core toward the axis of the mold and the core, thereby smoothly stretching the fabric annularly toward the center of the mold by an uninterrupted movement of the mold sections and preventing a buckling or folding of the carcass in the arch or tread portion of the tire. The action compares favorably to that of an ironing movement applied to the carcass by two mold sections moving in opposite directions from a common starting point at the tread, the movement progressing around a substantially round core toward a common point approximately diametrically opposite the place of beginning. Obviously, the surplus rubber, if any, is forced to find its outlet at the bottom of the wing or bead portions of the tire, and the fabric if it stretches in any measure moves toward the base or bead portions of the tire.

Figure 1:
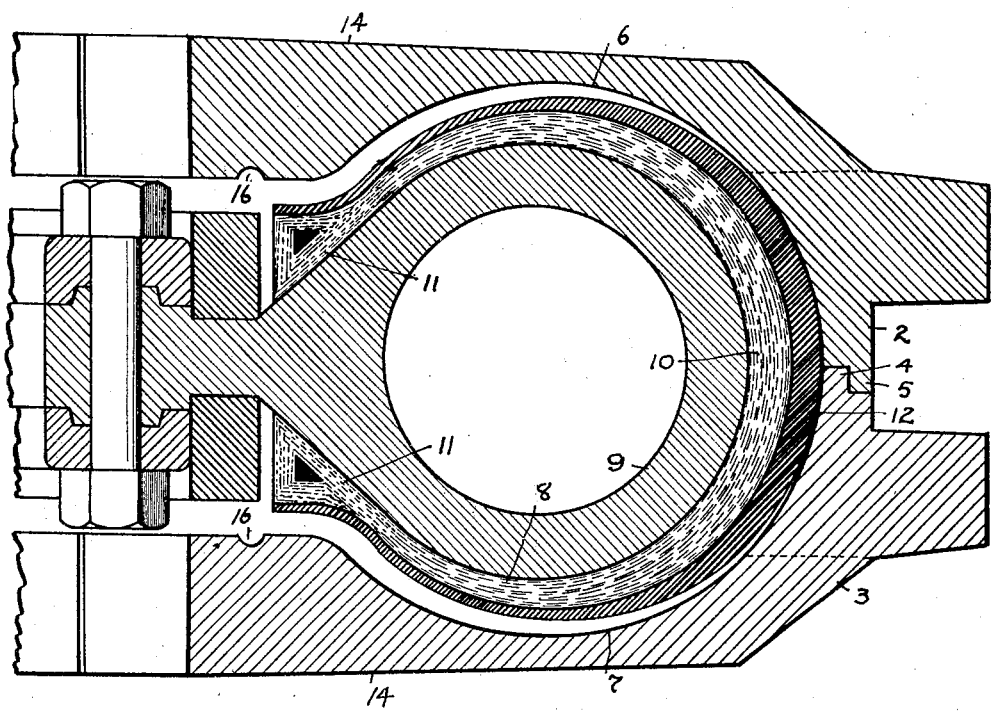
Figure 2:
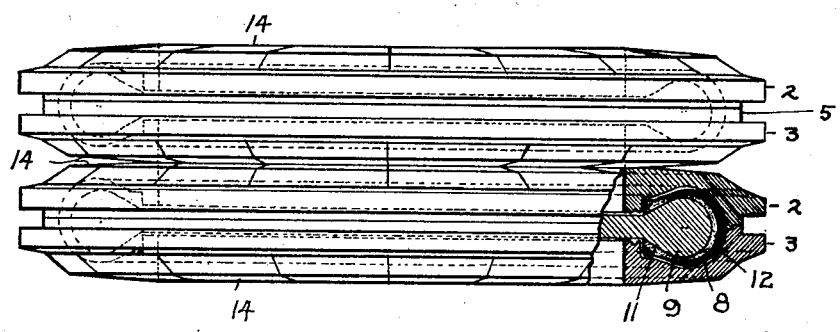

In the accompanying drawings, Figure 1 is a cross section of a sectional mold adapted to produce a tire according to my method and showing a core and a tire therein. Fig. 2 is a side view of two such molds as shown in Fig. 1, but on a smaller scale, and superimposed in the relation as used in a vulcanizing press.

The mold shown, consists of two annular mold sections 2 and 3, having interlocking shoulders 4 and 5, respectively, at their outer circumference or larger diameter and provided further with annular molding channels 6 and 7, respectively, which are oppositely disposed and have a given shape and outline corresponding to the exterior surface of the tire or tire casing to be molded. To illustrate my invention I show a mold patterned to make one of the more common and accepted forms of tires 8, and also show a core 9 of corresponding shape and which core may be solid or hollow or collapsible and constructed in any practical way for the purpose in hand. Thus, the tire shown comprises a carcass 10 built up of separate plies of woven fabric or cords impregnated or coated with rubber and formed into a circular shape, with greater thickness at the tread than at the sides, which terminate in beaded extremities 11 and form free wings and a seating base for the tire. This carcass may be treated alone, but the more general practice is to treat it together with a rubber tread 12 of substantial thickness. This rubber tread is usually of crescent shape in section, that is, thicker at the center and tapered at its edges to overlap the sides of the carcass more or less, and sometimes it extends to and incloses the bead portions of the carcass. It is also customary to embody breaker strips of fabric or other reinforcements in the tread portion of the tire, and to mold the rubber tread into irregular shapes and designs to improve the ornamental appearance and traction qualities of the tire.

Having a tire of substantially these characteristics the proposition then is to vulcanize the rubber embodied within and upon the carcass. In so doing and using molds as made heretofore, the irregular shape of the tire and mold and the placement of the core in eccentric relation to the mold channels causes the rubber and fabric to be moved and crowded in the direction of the tread and the parting line between the molds at the tread, and the old practice has been to permit the rubber to overflow into suitable overflow channels at such tread parting line, thus increasing the tendency to bring about a movement of the rubber and fabric in that common direction. The result has been that buckles, folds or creases are produced in the fabric, the softened rubber contained within the fabric or between the plies of fabric being also conducive to the displacement of a fabric under the pressure imparted to the molds and to the tire therein. I overcome this serious objection by using a pair of annular mold sections constructed to come into seating and interlocking engagement at the shoulders 4 and 5 before bringing any substantial compression upon the rubber tread and carcass, and also slope the mold sections toward their common axis and away from each other as indicated by a sloping outer face 14, so that when the two sections are assembled, the complete mold is slightly thicker at its center or inner circumference than at its outer circumference. Each mold is in the form of an annular dished plate and the mold chambers 6 and 7 in the respective sections are made of the same or substantially the same size as heretofore, with the exception possibly, that a slightly larger space may be provided opposite that portion of the mold which forms the base or bottom of the tire. When the sections are assembled, the opposed molding surfaces of the channels 6 and 7 will be spaced apart from the tire on diverging lines and incapable of producing the correct shape of tire except and until compressed to the maximum toward each other and the core. Thus, it occurs that when the sections are first placed in engaging relation at the shoulders 4 and 5, the inner annular portions of the mold are spread apart, and if there be a tire upon the core each mold section is slightly inclined relatively thereto and to a median horizontal line with the greatest amount of space at the inner circumference of such sections. It follows, therefore, that upon imparting pressure axially to one pair of mold sections or a plurality of such molds superimposed in a suitable vulcanizing press wherein a vulcanizing heat is maintained, the sections will be gradually flattened, that is, moved from an inclined to a horizontal plane, and compression of the tire will begin at the periphery or outer circumference of the tire and annularly of the tire and be gradually distributed to the remaining portions of the tire by a movement progressing on radial lines in the direction of each base or bead portion of the tire, thus tending to force the arched portion of the carcass against the core at all points therearound and with a movement inwardly toward the axis of the mold and the core, thereby smoothing or stretching the fabric inwardly toward the axis of the mold and preventing the formation of buckles or creases in the tread portion of the carcass. The movement may be relatively slight, but even under such circumstances, the pressing action as described works to counteract and prevent a movement of the fabric toward the tread and consequently prevents the formation of folds or creases in the fabric opposite the tread. Furthermore, and assuming that there is a surplus of rubber, the graduated pressure imparted by the sloping mold sections tends to crowd the surplus rubber continuously toward the points of least resistance, that is, toward the open space opposite the beaded portion of the tire, and if the surplus rubber is in excess of all needs the rubber may be permitted to overflow into an annular recess or overflow channel 16 in the face of each mold section.

In actual practice, the method involves the placing of a plurality of sectional folding molds as described in superposed position within a vulcanizing press, each tire mold containing a tire of rubber and fabric and the respective sections of each mold being spread apart or open at the parting line at their inner circumference. The next steps consist in applying pressure and a vulcanizing heat to all of the molds in the press, and the pressure is applied axially to the molds where engaged with each other at their smallest diameter, the pressure continuing until all the molds are closed and all the tires are compressed from tread to base as hereinbefore described. Vulcanization takes place during the interval that the molds are compressed, and steam or any other suitable heating agent may be used at the temperatures and for the periods of time required for the particular compound used and as known to those skilled in the art.

What I claim is:

1. A method of making rubber tires, consisting in placing a tire composed of rubber and fabric in a sectional mold constructed and interconnected to turn its sections toward each other in graduated degree from a pivot point approximately opposite the tread to the base portion of the tire, and in applying pressure axially to the mold at its inner diameter until the mold sections are folded together.

2. A method of making rubber tires having a fabric or cord carcass, consisting in applying pressure to a plurality of superposed mold sections which are spread apart on diverging lines and widest at their inner diameter and engaged at their outer diameter and continuing such pressure axially of the mold sections while turning the sections toward each other by fine, slight or insensible gradations or modulations, until the entire carcass in each mold is stretched smoothly and uniformly from the tread portion to the base portions thereof.

3. A method of making rubber tires, consisting in placing a tire between two folding mold sections, in applying pressure axially to said sections and compressing the tire annularly by slight or insensible gradations or modulations beginning at the tread portion and proceeding around the sides of the tire to its rim-seating base, and in subjecting said mold and compressed tire to heat until the rubber therein is vulcanized.

4. A method of making a tire having a rubber-impregnated fabric or cord carcass, consisting in forming a tire from fabric and rubber on a core and placing the core and tire between folding mold sections and applying pressure to the said sections to fold them toward each other and compress the tire by fine or insensible gradations or modulations around the core from the median line at the tread portion thereof and in the direction of and to the base portions of the carcass, and then subjecting the mold and carcass to heat while in that stretched state.

5. A method of making a tire, consisting in placing a rubber-treated beaded tire carcass upon a core and within a sectional mold and imparting a pressure movable or changing by fine, slight gradations to the carcass beginning at the outer diameter of the mold and the tread portion of the tire and moving toward the base portions of the tire.

Signed at Trenton, in the county of Mercer, and State of New Jersey, this 29th day of June, 1918.

JAMES A. SWINEHART.